US010604965B2

(12) United States Patent
Bartneck et al.

(10) Patent No.: US 10,604,965 B2
(45) Date of Patent: Mar. 31, 2020

(54) METHOD AND APPARATUS FOR CLOCKING STOWAGE BIN LATCHES

(71) Applicant: THE BOEING COMPANY, Chicago, IL (US)

(72) Inventors: Brandon Bartneck, Charleston, SC (US); Nicholas George Jellyman, Summerville, SC (US)

(73) Assignee: The Boeing Company, Chicago, IL (US)

( * ) Notice: Subject to any disclaimer, the term of this patent is extended or adjusted under 35 U.S.C. 154(b) by 623 days.

(21) Appl. No.: 15/252,864

(22) Filed: Aug. 31, 2016

(65) Prior Publication Data

US 2018/0058097 A1    Mar. 1, 2018

(51) Int. Cl.
E05B 17/00    (2006.01)
E05C 3/28    (2006.01)
B64F 5/10    (2017.01)
B64D 11/00    (2006.01)

(52) U.S. Cl.
CPC .......... E05B 17/0012 (2013.01); B64F 5/10 (2017.01); E05C 3/28 (2013.01); *B64D 11/003* (2013.01)

(58) Field of Classification Search
CPC ... B64D 11/003; E05Y 2900/502; E05C 3/12; A62B 7/14; Y10T 292/1047
See application file for complete search history.

(56) References Cited

U.S. PATENT DOCUMENTS

| | | | | |
|---|---|---|---|---|
| 4,368,937 A * | 1/1983 | Palombo | ............. | B64D 11/003 296/37.7 |
| 4,584,616 A * | 4/1986 | Allen | ..................... | G11B 20/12 360/48 |
| 6,457,675 B1 * | 10/2002 | Plude | .................... | B64C 1/1415 244/129.5 |
| 8,162,412 B2 * | 4/2012 | Unger | .................... | A47K 10/32 312/325 |
| 8,833,698 B2 * | 9/2014 | Rafler | ................. | B64D 11/003 244/118.5 |
| 9,601,913 B2 * | 3/2017 | Killen | .................... | B65H 49/32 |
| 9,656,106 B2 * | 5/2017 | Hollm | ....................... | A62B 7/14 |
| 10,106,258 B2 * | 10/2018 | Kammerer | .......... | B64D 11/003 |
| 10,112,717 B2 * | 10/2018 | Savian | ................ | B64D 11/003 |
| 2011/0254705 A1 * | 10/2011 | Hashberger | ......... | B64D 11/003 340/945 |
| 2014/0339353 A1 * | 11/2014 | Killen | ................... | A61F 2/3676 242/557 |
| 2018/0281956 A1 * | 10/2018 | Fischer | ............... | B64D 11/003 |
| 2018/0328397 A1 * | 11/2018 | Hernandez | ............. | F16B 21/04 |

* cited by examiner

*Primary Examiner* — Mark A Williams
(74) *Attorney, Agent, or Firm* — McDonnell Boehnen Hulbert & Berghoff LLP

(57) ABSTRACT

An apparatus for clocking a shaft of a latch relative to a housing of the latch is disclosed. The apparatus comprises a body, comprising a surface and a first opening, formed through the surface. The first opening has a first symmetry axis, and the first symmetry axis is perpendicular to the surface of the body. The apparatus also comprises a first funnel, comprising an inlet and a second symmetry axis. The second symmetry axis of the first funnel is parallel to the first symmetry axis of the first opening. Further, the second symmetry axis of the first funnel is spaced a fixed distance away from the first symmetry axis of the first opening. The fixed distance is greater than zero.

46 Claims, 12 Drawing Sheets

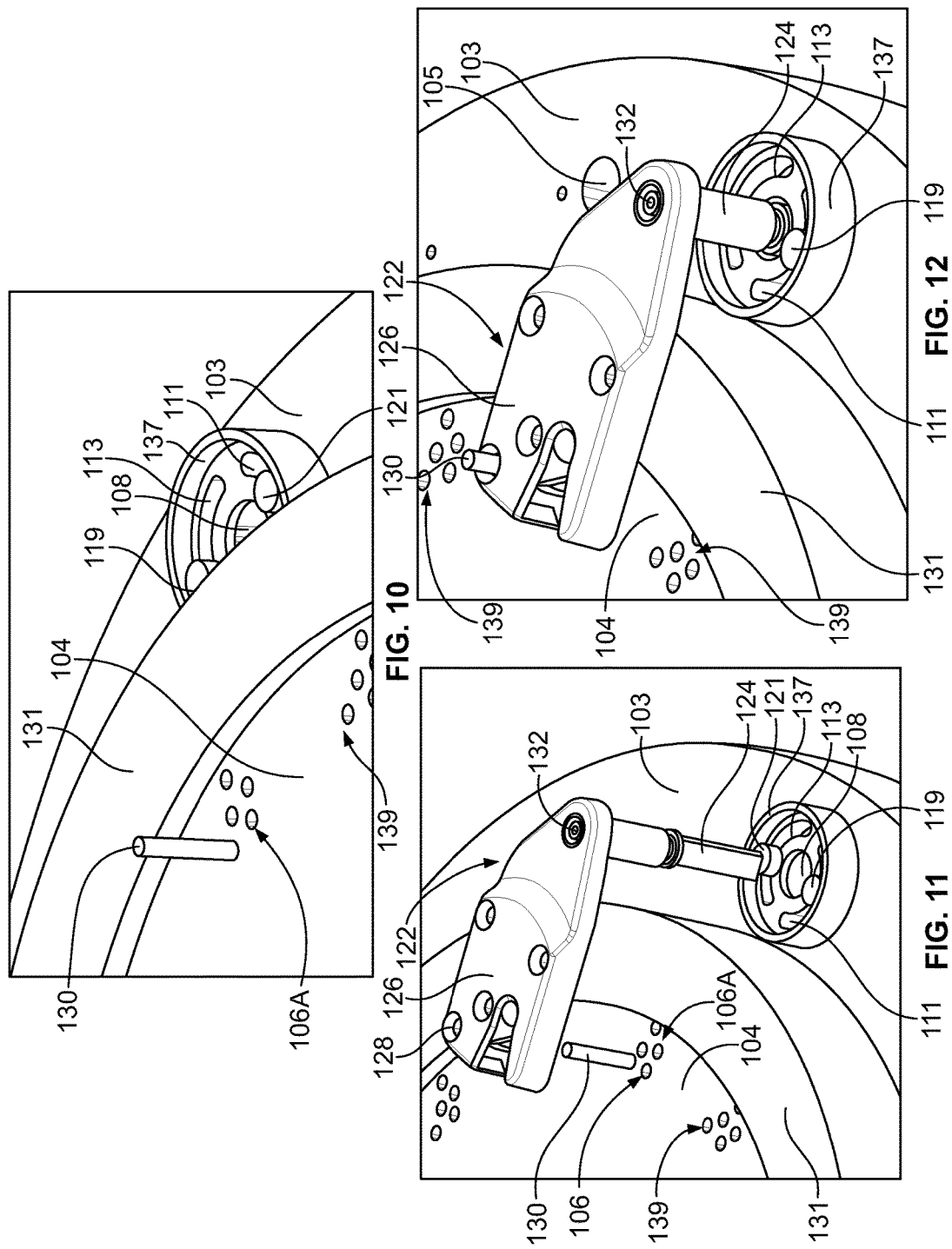

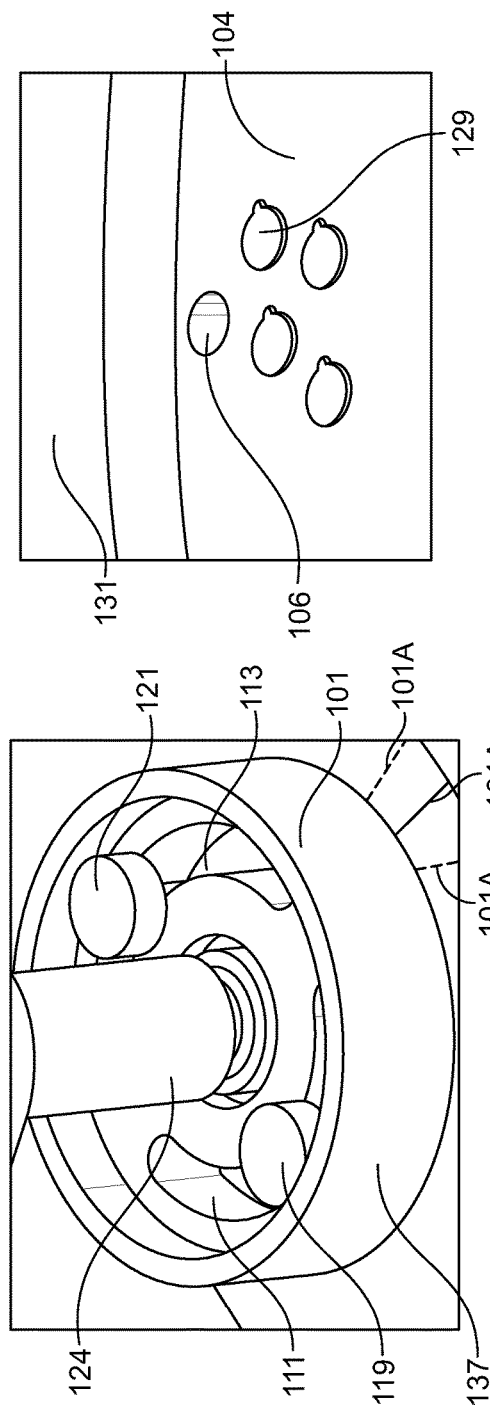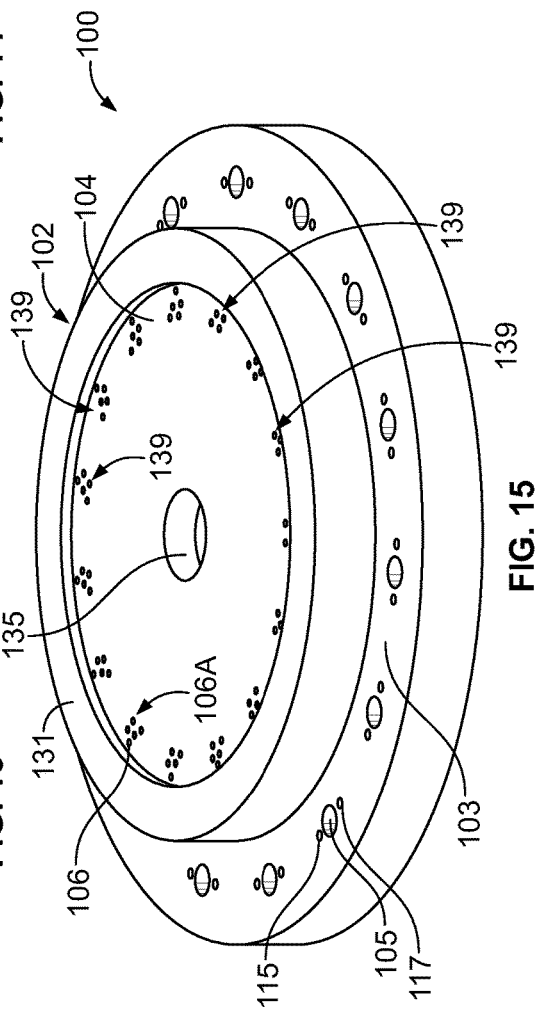
FIG. 13
FIG. 14
FIG. 15

METHOD AND APPARATUS FOR CLOCKING STOWAGE BIN LATCHES

TECHNICAL FIELD

The present disclosure relates to apparatuses and methods for clocking stowage-bin latches.

BACKGROUND

Stowage bins typically include two latches that keep the stowage bin closed when an aircraft is in flight. When a user pulls a handle to open the stowage bin, it is desirable for both latches to disengage simultaneously. Likewise, it is desirable for both latches to engage simultaneously when the stowage bin is shut by the user. As such, during assembly of the stowage bin, it is important to provide a specific angular relationship between the corresponding shafts and bodies of the two latches by properly clocking the latches. The existing method of clocking stowage-bin latches is to secure the latches to a stowage bin and perform a multi-step clocking procedure at that juncture. This approach is time consuming and inconsistent, leading to increased manufacturing lead times.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for clocking a shaft of a latch relative to a housing of the latch. The apparatus comprises a body, comprising a surface and a first opening, formed through the surface. The first opening has a first symmetry axis and a first rotational symmetry of at least a second order about the first symmetry axis. The first symmetry axis is perpendicular to the surface of the body. The apparatus also comprises a first funnel, comprising an inlet and a second symmetry axis. The first funnel has a second rotational symmetry of at least the second order about the second symmetry axis. The second symmetry axis of the first funnel is parallel to the first symmetry axis of the first opening. The second symmetry axis of the first funnel is spaced a fixed distance away from the first symmetry axis of the first opening. The fixed distance is greater than zero, and the fixed distance is measured along a line perpendicular to the second symmetry axis of the first funnel.

A stowage bin of e.g. an aircraft includes two latches that keep the stowage bin closed when an aircraft is in flight. When a user pulls a handle to open the stowage bin, it is desirable for both latches to disengage simultaneously. The latches should also engage simultaneously when the stowage bin is closed by the user. To ensure that both latches activate simultaneously, during assembly of the stowage bin it is important to maintain a specific relationship between the shaft of the latch and the housing of the latch when clocking the latch. In particular, the angle of the shaft of the latch with respect to the housing of the latch must be consistent, so that when the latches are coupled with a square control rod of the stowage bin, the latches engage and disengage simultaneously when the square rod is rotated, e.g., as the handle of the stowage bin is activated by the user.

The apparatus provides an improved system for clocking the latches of the stowage bin. In particular, the shaft of the latch is positioned in the first funnel in the body of the apparatus, and the housing of latch is held in a specific orientation on the surface of the body of the apparatus by positioning a pin through the housing and into the first opening, formed through the surface of the body. With such a configuration, any number of latches may be identically clocked using the apparatus, thereby ensuring consistent engagement/disengagement of the latches in the stowage bin and thereby eliminating the need for rework due to inconsistent clocking of the latches.

Another example of the subject matter according to the invention relates to a method of clocking a shaft of a latch relative to a housing of the latch. The method comprises inserting one end of the shaft of the latch into a first funnel, fixed relative to a body and having a second rotational symmetry of at least a second order about a second symmetry axis of the first funnel, to rotationally position the shaft relative to the body. The method also comprises rotating the housing of the latch relative to the shaft of the latch to align a through opening in the housing of the latch with a first opening, formed in the body through a surface of the body. The first opening has a first symmetry axis and a first rotational symmetry of at least the second order about the first symmetry axis. The first symmetry axis of the first opening is perpendicular to the surface of the body. The first symmetry axis of the first opening is spaced a fixed distance away from the second symmetry axis of the first funnel along a line perpendicular to the second symmetry axis of the first funnel, such that the fixed distance is greater than zero. The method also comprises inserting a first portion of a locating pin into the first opening in the body so that at least a second portion of the locating pin is within the through opening in the housing of the latch. The method further comprises securing the shaft of the latch relative to the housing of the latch.

The above method is an improved method for clocking the latches of a stowage bin, located, e.g., in an aircraft. In particular, the shaft of the latch is placed into the first funnel. While the shaft is in the first funnel, the housing of the latch is rotated until the through opening in the housing is aligned with the first opening, formed in the body. Once the through opening is aligned with the first opening, the locating pin is inserted to lock the latch in place. Using the above-described method, a number of latches may be identically clocked, thereby ensuring consistent engagement/disengagement of the latches in the stowage bin and thereby eliminating the need for rework due to inconsistent clocking of the latches.

Yet another example of the subject matter according to the invention relates to method of clocking a shaft of a latch relative to a housing of the latch. The method comprises inserting a first portion of a locating pin into a first opening, passing through a surface of a body and having a first symmetry axis and a first rotational symmetry of at least a second order about the first symmetry axis. The method further comprises aligning the shaft of the latch with an inlet of a first funnel. The first funnel has a second rotational symmetry of at least the second order about a second symmetry axis of the first funnel. The first funnel is fixed relative to the body. The first symmetry axis of the first opening in the body is spaced a fixed distance away from the second symmetry axis of the first funnel along a line perpendicular to the second symmetry axis of the first funnel, such that the fixed distance is greater than zero. The method also comprises aligning a through opening in the housing of the latch with the locating pin, the first portion of which is inserted into the first opening of the body. The method further comprises inserting one end of the shaft of the latch into the first funnel to rotationally position the shaft relative to the body while simultaneously inserting a second portion of the locating pin, the first portion of which is inserted into the first opening of the body, into the through opening in the housing of the latch. The method further comprises securing the shaft of the latch relative to the housing of the latch.

The method above is another improved method for clocking the latches of a stowage bin located, e.g., in an aircraft. In particular, the locating pin is positioned in the first opening in the housing. The through opening is then simultaneously lined up with the locating pin while the shaft of the latch is inserted into the first funnel of the body. Once the latch is in place, the shaft of the latch is secured relative to the housing. Using such a method, a number of latches may be identically clocked, thereby ensuring consistent engagement/disengagement of the latches in the stowage bin and thereby eliminating the need for rework due to inconsistent clocking of the latches.

BRIEF DESCRIPTION OF THE DRAWINGS

Figure 1:
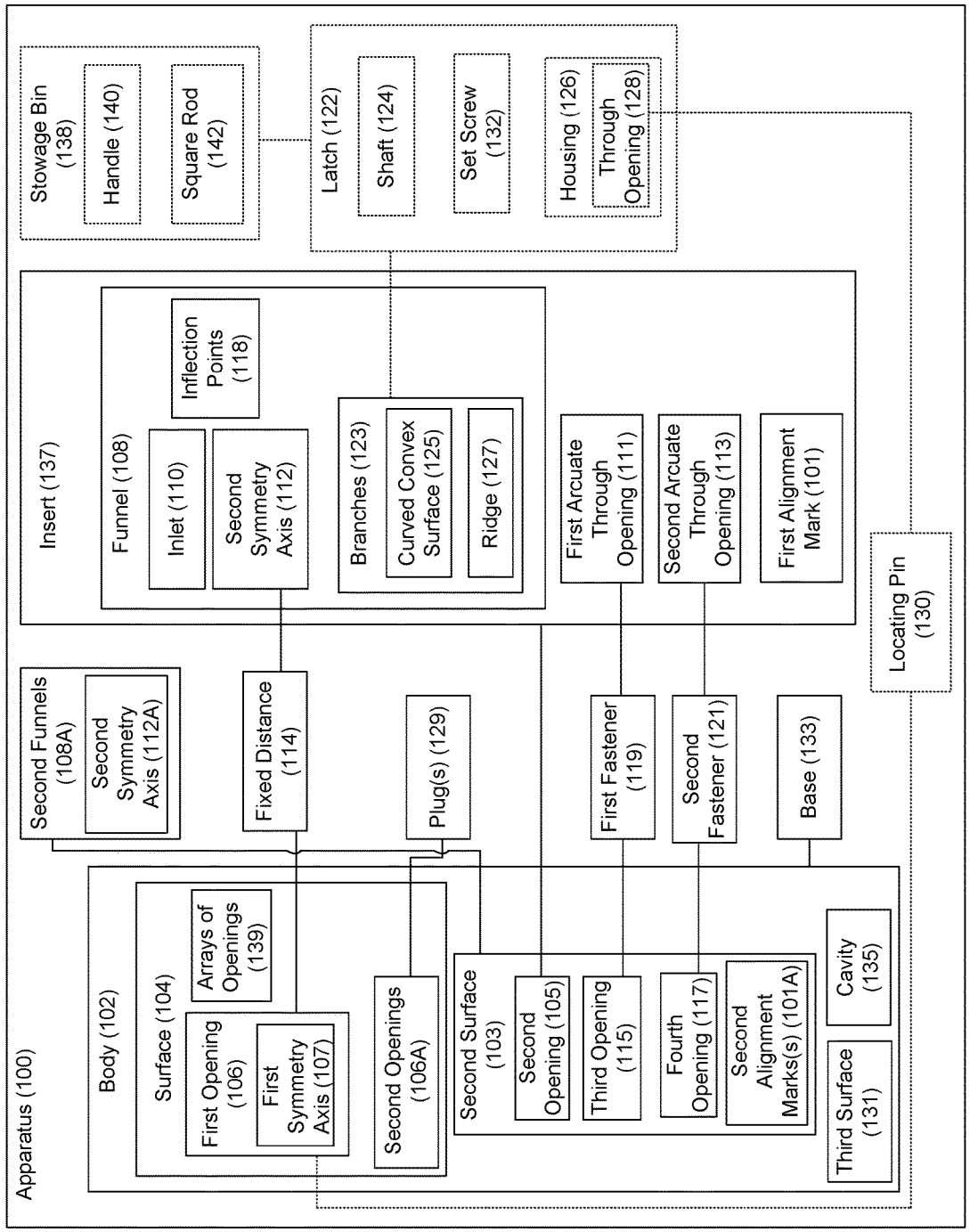
Figure 2:
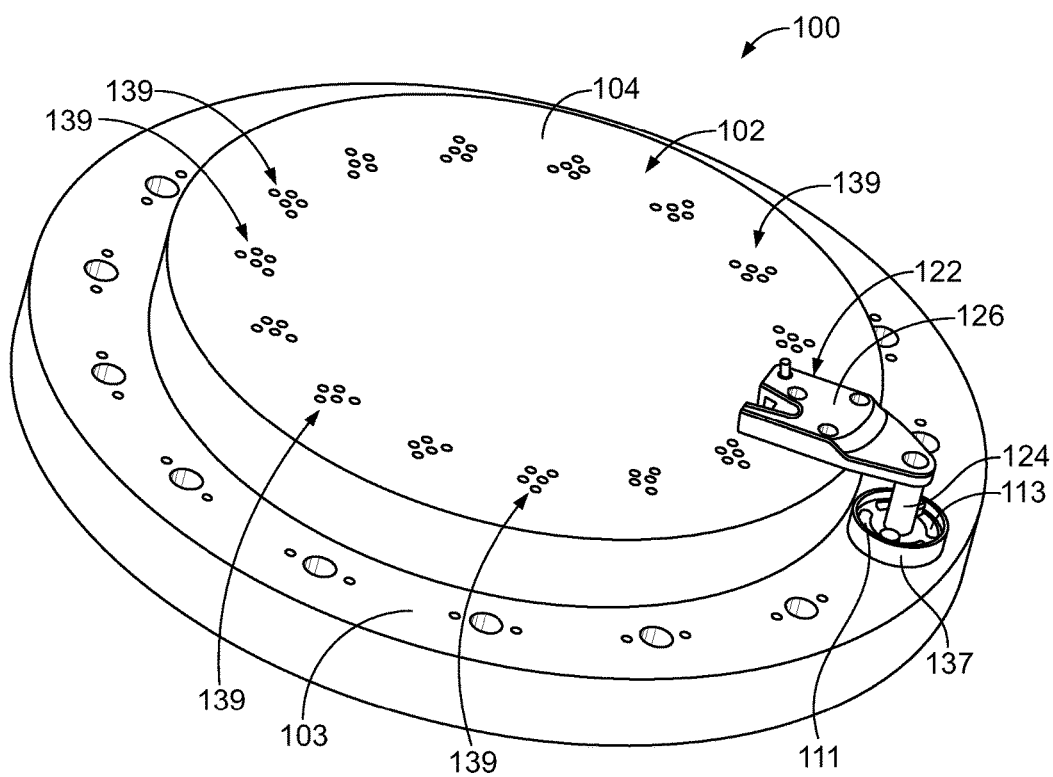
Figure 3:
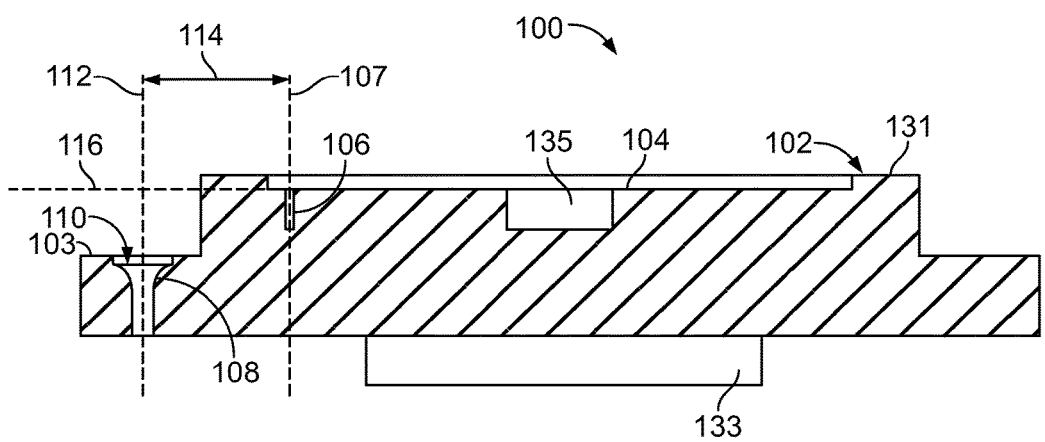
Figure 4:
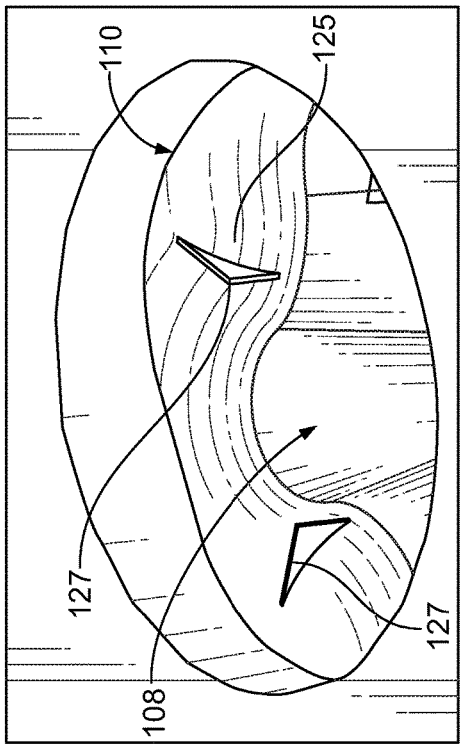
Figure 5:
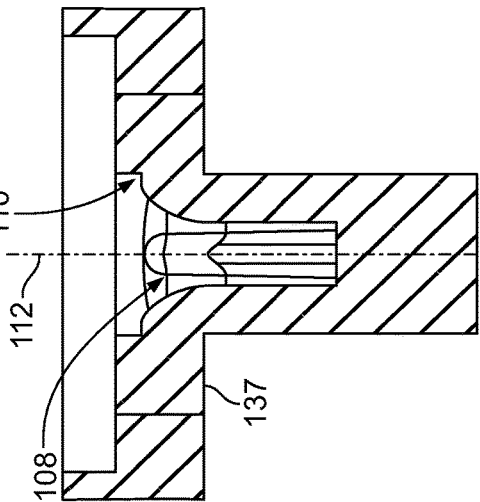
Figure 6:
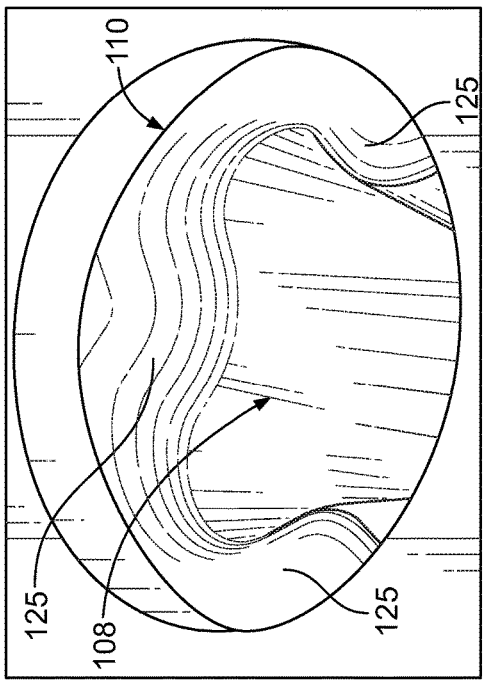
Figure 7:
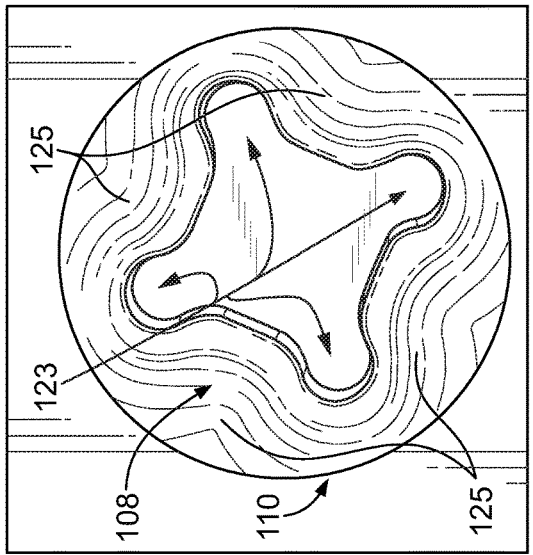
Figure 8:
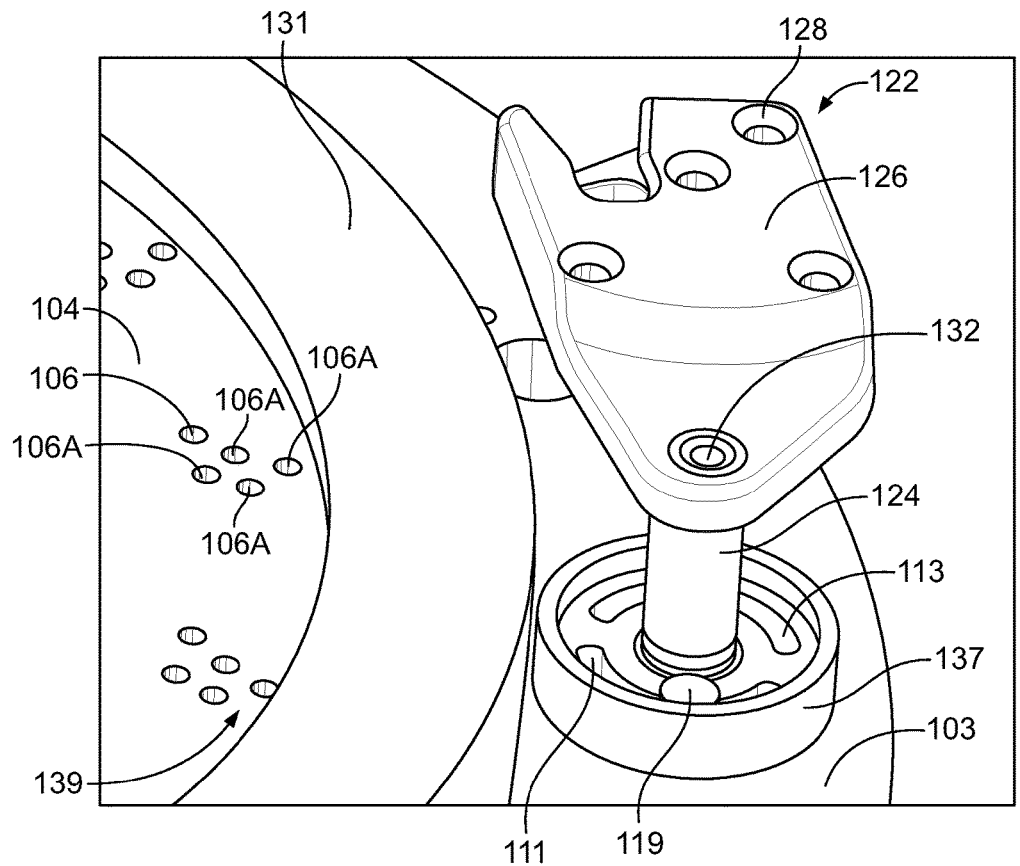
Figure 9:
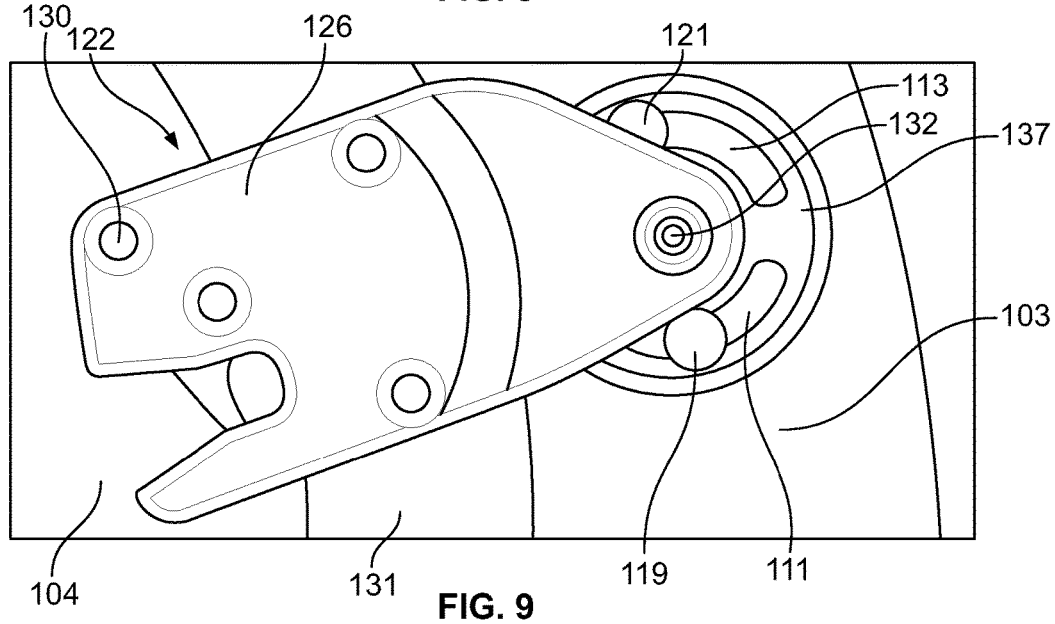
Figure 16:
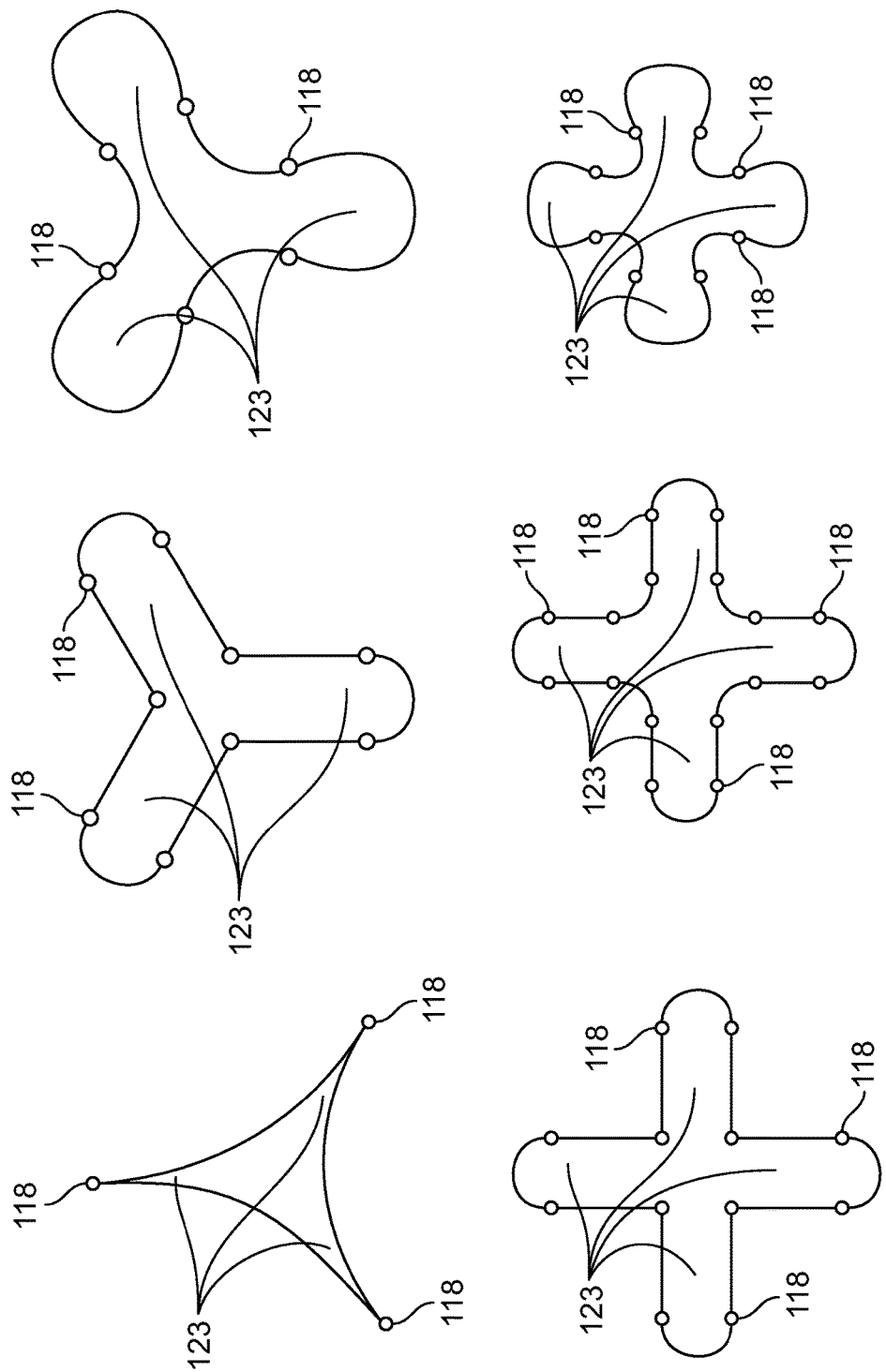
Figure 17:
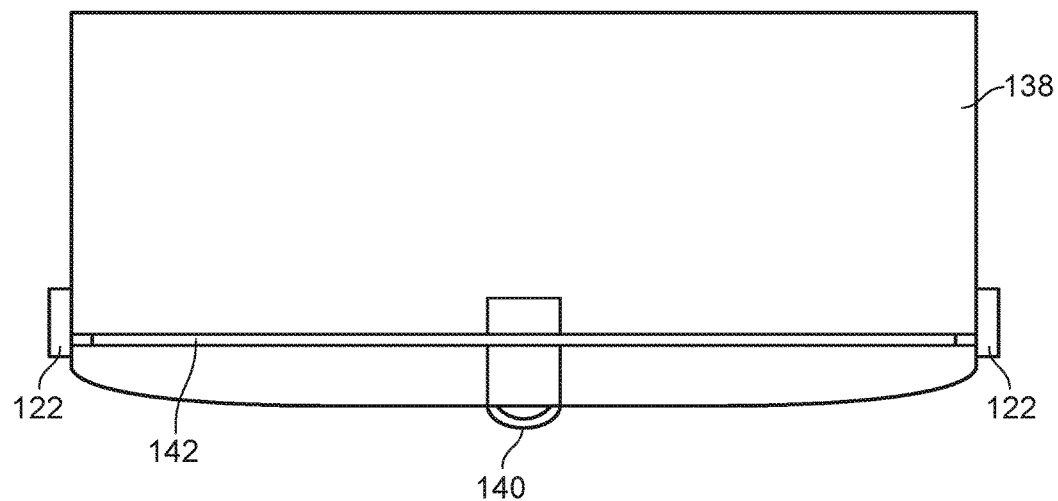
Figure 18:
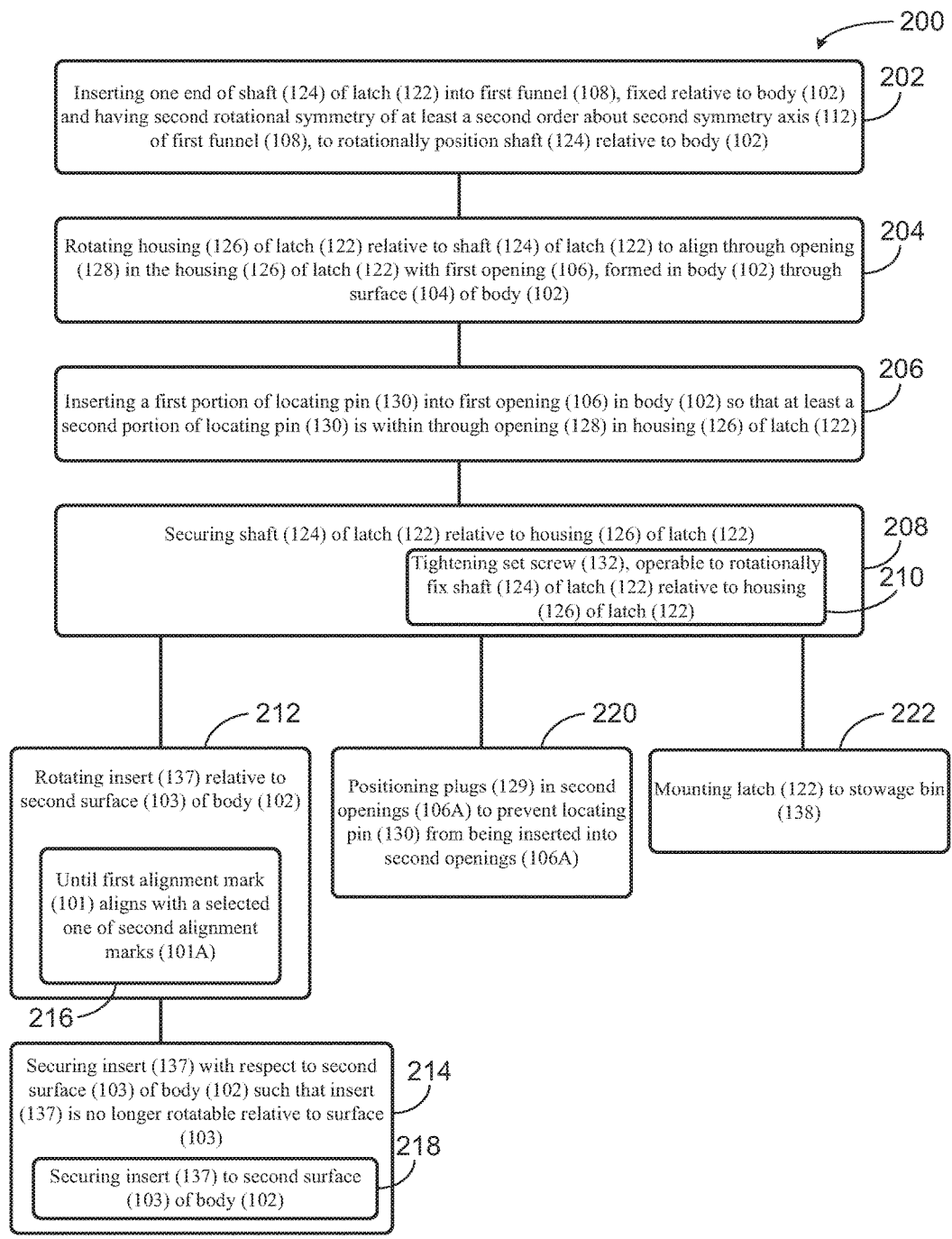
Figure 19:
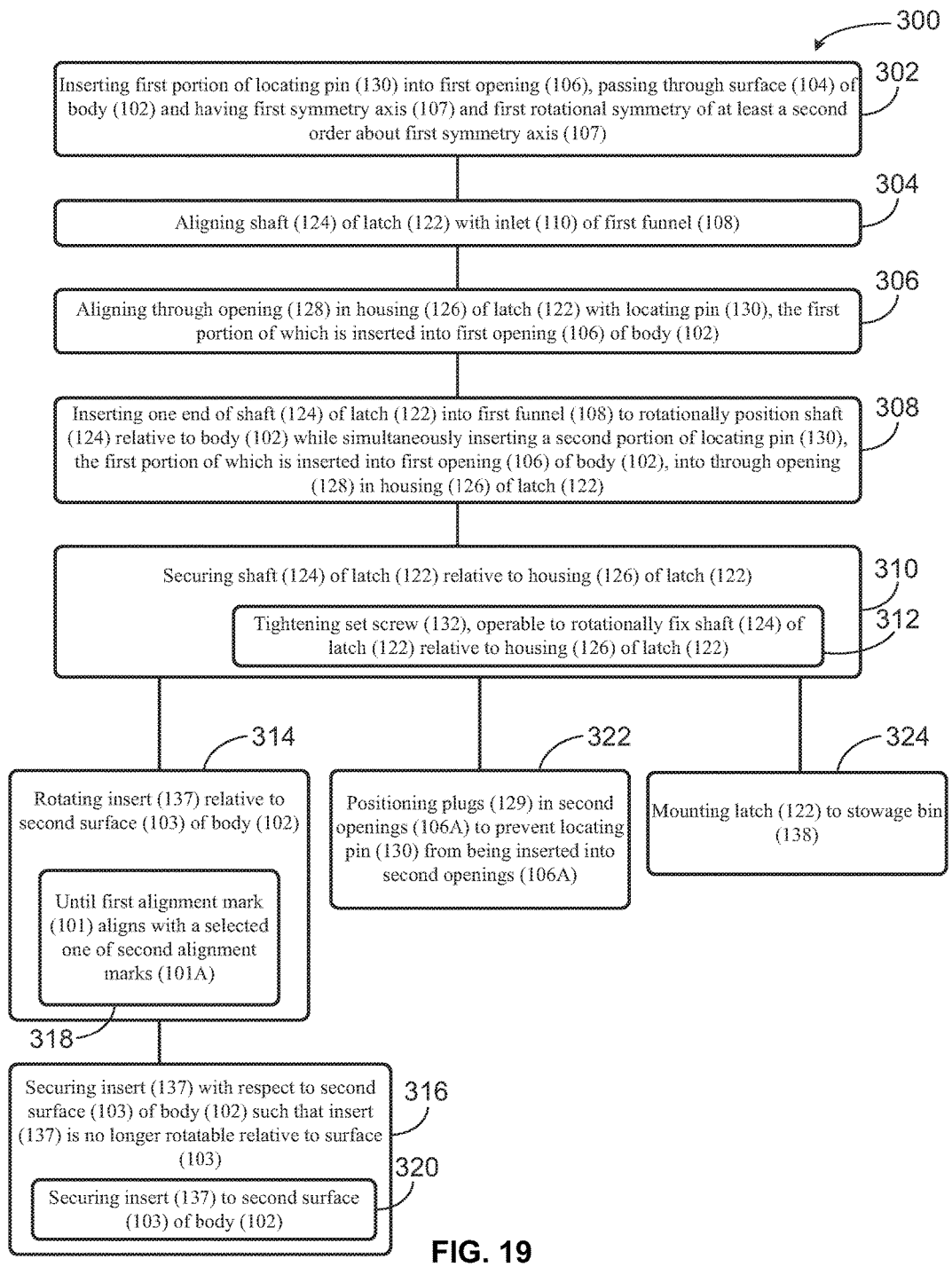
Figure 20:
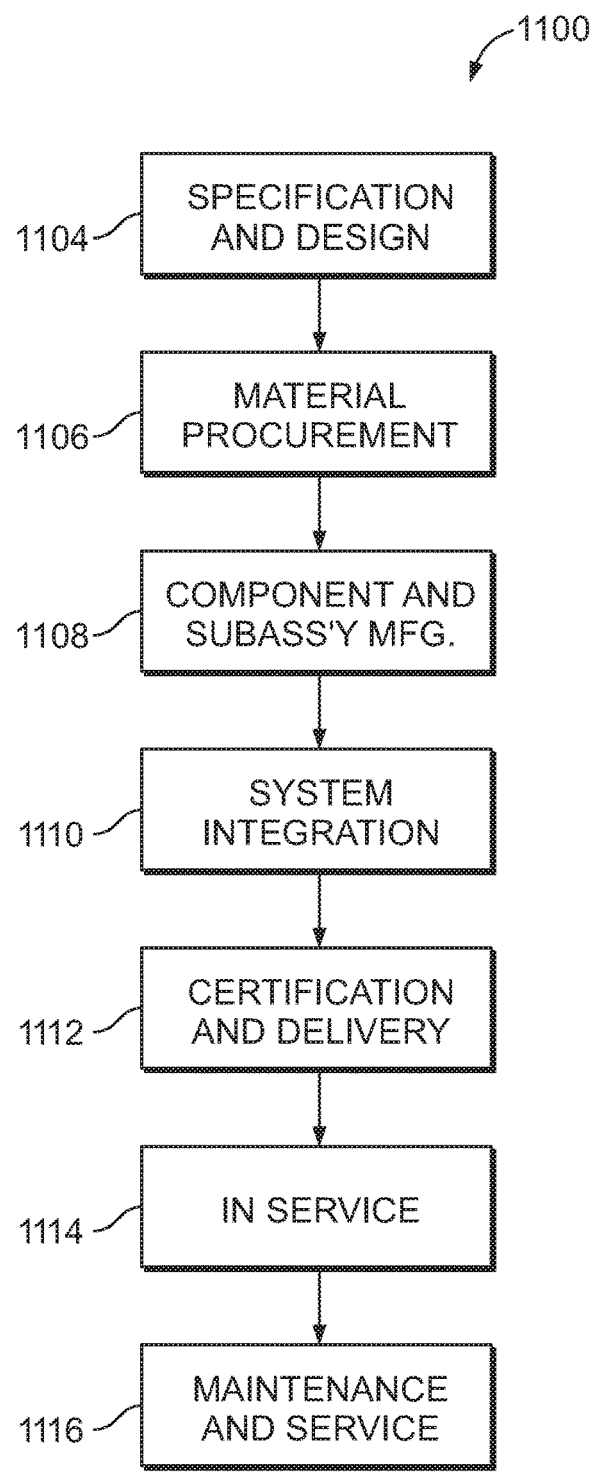

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of an apparatus, according to one or more examples of the present disclosure;

FIG. 2 is a schematic, perspective view of the apparatus of FIG. 1, according to one or more examples of the present disclosure;

FIG. 3 is a schematic, cross-sectional view of the apparatus of FIG. 1, according to one or more examples of the present disclosure;

FIG. 4 is a schematic, perspective view of a funnel of the apparatus of FIG. 1, according to one or more examples of the present disclosure;

FIG. 5 is a schematic, perspective view of the funnel of FIG. 1 including ridges, according to one or more examples of the present disclosure;

FIG. 6 is a schematic, top elevation view of the funnel of FIG. 4, according to one or more examples of the present disclosure;

FIG. 7 is a schematic, cross-sectional view of the funnel of FIG. 4, according to one or more examples of the present disclosure;

FIG. 8 is a schematic, perspective view of a detail of the apparatus of FIG. 1, according to one or more examples of the present disclosure;

FIG. 9 is a schematic, top plan view of a detail of the apparatus of FIG. 1, according to one or more examples of the present disclosure;

FIG. 10 is a schematic, perspective view of a detail of the apparatus of FIG. 1, according to one or more examples of the present disclosure;

FIG. 11 is a schematic, perspective view of a detail of the apparatus of FIG. 1, according to one or more examples of the present disclosure;

FIG. 12 is a schematic, perspective view of a detail of the apparatus of FIG. 1, according to one or more examples of the present disclosure;

FIG. 13 is a schematic, perspective view of an insert of the apparatus of FIG. 1, according to one or more examples of the present disclosure;

FIG. 14 is a schematic, perspective view of plugs of the apparatus of FIG. 1, according to one or more examples of the present disclosure;

FIG. 15 is a schematic, perspective view of the apparatus of FIG. 1, according to one or more examples of the present disclosure;

FIG. 16 is a schematic, top elevation view of different configurations of funnels of the apparatus of FIG. 1, according to one or more examples of the present disclosure;

FIG. 17 is a schematic, side elevation view of a stowage bin including latches, according to one or more examples of the present disclosure;

FIG. 18 is a block diagram of a method of utilizing the apparatus of FIG. 1, according to one or more examples of the present disclosure;

FIG. 19 is a block diagram of another method of utilizing the apparatus of FIG. 1, according to one or more examples of the present disclosure;

FIG. 20 is a block diagram of aircraft production and service methodology; and

Figure 21:
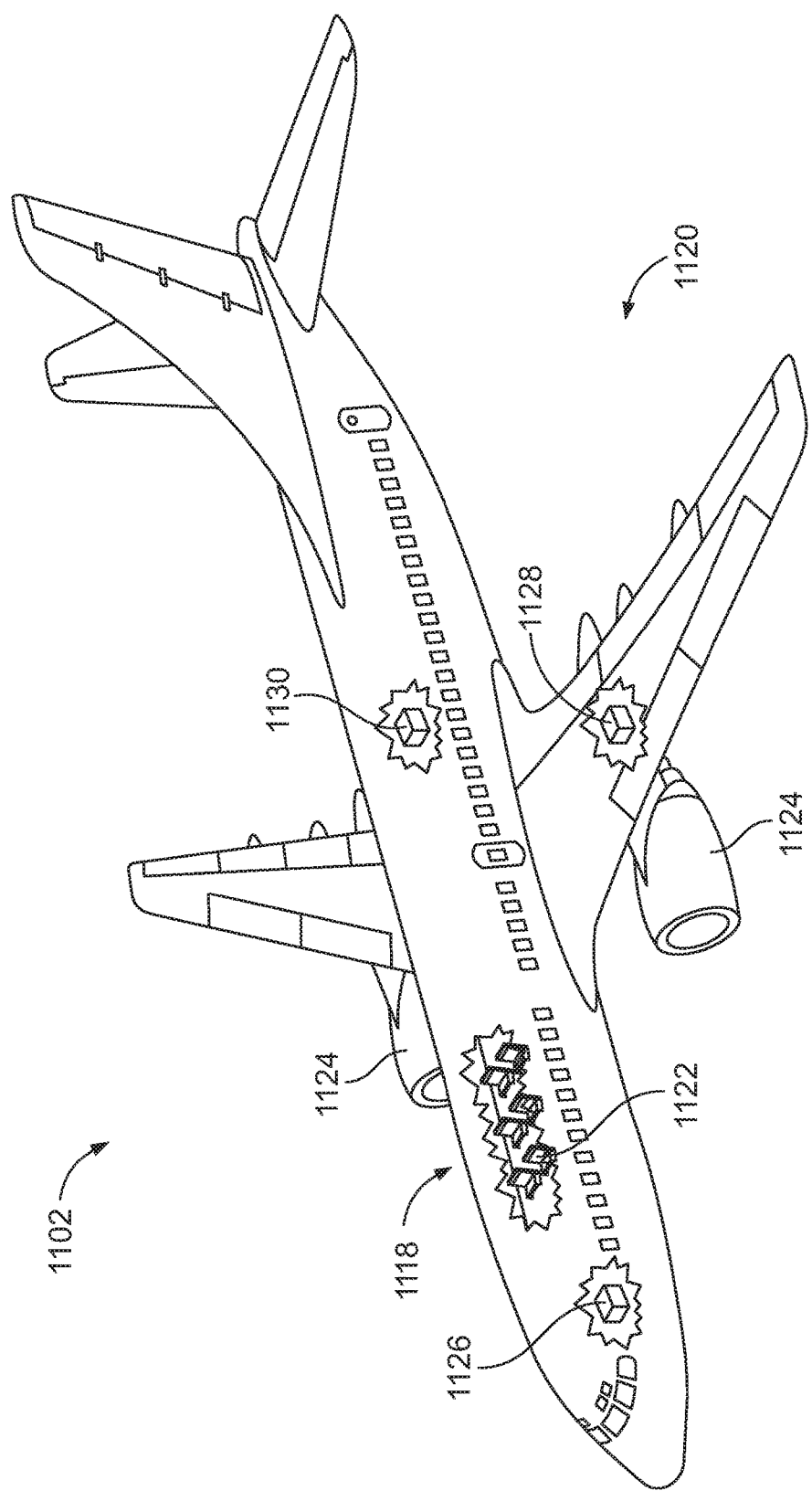

FIG. 21 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 18 and 19, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 18 and 19 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-3, 8-12, and 15, apparatus 100 for clocking shaft 124 of latch 122 relative to housing 126 of latch 122 is disclosed. Apparatus 100 comprises body 102, comprising surface 104 and first opening 106, formed through surface 104. First opening 106 has first symmetry axis 107 and a first rotational symmetry of at least a second order about first symmetry axis 107. First symmetry axis 107 is perpendicular to surface 104 of body 102. Apparatus 100 also comprises first funnel 108, comprising inlet 110 and second symmetry axis 112. First funnel 108 has a second rotational symmetry of at least the second order about second symmetry axis 112. Second symmetry axis 112 of first funnel 108 is parallel to first symmetry axis 107 of first opening 106. Additionally, second symmetry axis 112 of first funnel 108 is spaced fixed distance 114 away from first symmetry axis 107 of first opening 106. Fixed distance 114 is greater than zero and is measured along a line perpendicular to second symmetry axis 112 of first funnel 108. The preceding subject matter of this paragraph characterizes example 1 of the present disclosure.

As illustrated in FIG. 17, stowage bin 138 includes two latches 122 that keep stowage bin 138 closed when an aircraft is in flight. When a user pulls handle 140 to open stowage bin 138, it is desirable for both latches 122 to disengage simultaneously. Latches 122 should also engage simultaneously when stowage bin 138 is closed by the user. To ensure that both latches 122 activate simultaneously, during assembly of stowage bin 138 it is important to maintain a specific relationship between shaft 124 of latch 122 and housing 126 of latch 122 when clocking latch 122. In particular, the angle of shaft 124 of latch 122 with respect to housing 126 of latch 122 must be consistent, so that when latches 122 are coupled with square rod 142 of stowage bin 138, latches 122 engage and disengage simultaneously when square rod 142 is rotated, e.g., as handle 140 of stowage bin 138 is activated by the user.

Apparatus 100 provides an improved system for clocking latches 122. In particular, shaft 124 of latch 122 is positioned in first funnel 108, and housing 126 of latch 122 is held in a specific orientation on surface 104 by positioning pin 130 through housing 126 and into first opening 106. With such a configuration, any number of latches may be identically clocked using apparatus 100, thereby ensuring consistent engagement/disengagement of latches 122 in stowage bin 138 and thereby eliminating the need for rework due to inconsistent clocking of latches 122.

As used herein, "rotational symmetry" means the property a shape has when it looks the same after some rotation by a partial turn. An object's degree of rotational symmetry is the number of distinct orientations in which it looks the same.

In one example, the rotational symmetry of first opening 106 is order infinity (e.g., a cylindrical opening). In another example, the rotational symmetry of first opening 106 is finite. In such an example, the geometry of locating pin 130 may conform to that of opening 106. However, the geometry of through opening 128 may be cylindrical, with a diameter sufficient to accept locating pin 130 with a clearance fit. The rotational symmetry of first funnel 108 is finite. For example, first funnel 108 may have a rotational symmetry to accommodate triangular, rectangular, or hexagonal cross-sections of shaft 124 of latch 122. Other finite rotational symmetries are possible as well for first funnel 108. Latches 122 may be "left-hand" or "right-hand", based on which side of stowage bin 138 they will be placed during assembly. Apparatus 100 may be configured for use in clocking only "right-hand" latches, only "left-hand" latches, or both "right-hand" and "left-hand" latches.

Referring generally to FIG. 1 and particularly to, e.g., FIGS. 3-7, first funnel 108 is fixed relative to body 102. The preceding subject matter of this paragraph characterizes example 2 of the present disclosure, wherein example 2 also includes the subject matter according to example 1, above.

Fixing first funnel 108 relative to body 102 may provide for more consistent clocking of latch 122. In particular, such an arrangement may reduce the guesswork by operators since the specific relationship between shaft 124 of latch 122 and housing 126 of latch 122 will always be the same. In such an example, first funnel 108 may be formed as part of body 102 during manufacturing.

Referring generally to FIG. 1 and particularly to, e.g., FIGS. 2, and 8-13, first funnel 108 is rotatable relative to body 102 about second symmetry axis 112. The preceding subject matter of this paragraph characterizes example 3 of the present disclosure, wherein example 3 also includes the subject matter according to example 1, above.

The ability to rotate first funnel 108 with respect to body 102 about second symmetry axis enables an operator to adjust the relationship between shaft 124 of latch 122 and housing 126 of latch 122 when clocking latch 122. Such an arrangement may be beneficial for having a single apparatus 100 for clocking different types of latches, such as latches for a first aircraft stowage bin as well as latches for a second aircraft stowage bin.

Referring generally to FIG. 1 and particularly to, e.g., FIGS. 8-13, apparatus 100 further comprises insert 137. Body 102 further comprises second surface 103, parallel to surface 104 of body 102 and recessed relative to surface 104 along a line parallel to second symmetry axis 112 of first funnel 108. Body 102 further comprises second opening 105, formed through second surface 103 of body 102. Second opening 105 has a symmetry axis collinear with second symmetry axis 112 of first funnel 108. First funnel 108 is formed in insert 137 and at least a portion of insert 137 is positioned within second opening 105 of body 102. The preceding subject matter of this paragraph characterizes example 4 of the present disclosure, wherein example 4 also includes the subject matter according to example 3, above.

Second surface 103 is offset from surface 104 so that first funnel 108 is in one plane, while opening 106 is in a separate plane. Such an arrangement enables shaft 124 of latch 122 to be inserted in first funnel 108 while housing 126 of latch 122 is positioned on surface 104. Insert 137 is positioned within second opening 105 of body 102 to enable adjustability of first funnel 108, as discussed below.

Referring generally to FIG. 1 and particularly to, e.g., FIGS. 7-13, at least the portion of insert 137 is rotatably positioned within second opening 105 of body 102. The preceding subject matter of this paragraph characterizes example 5 of the present disclosure, wherein example 5 also includes the subject matter according to example 4, above.

As discussed above, the ability to rotate insert 137, and in turn rotate first funnel 108 with respect to body 102 about second symmetry axis, enables an operator to adjust the relationship between shaft 124 of latch 122 and housing 126 of latch 122 when clocking latch 122. Such an arrangement may be beneficial for having a single apparatus 100 for clocking different types of latches, such as latches for a first aircraft stowage bin as well as latches for a second aircraft stowage bin.

Referring generally to FIG. 1 and particularly to, e.g., FIGS. 8-13, insert 137 comprises first arcuate through opening 111, corresponding to a first portion of a virtual toroid. Body 102 further comprises third opening 115, formed through second surface 103 of body 102. First arcuate through opening 111 of insert 137 is capable of being aligned with third opening 115 of body 102 when at least the portion of insert 137 is rotatably positioned within second opening 105 of body 102. The preceding subject matter of this paragraph characterizes example 6 of the present disclosure, wherein example 6 also includes the subject matter according to example 5, above.

First arcuate through opening 111 enables the operator to adjust the rotational position of insert 137 with respect to body 102.

As used herein, "virtual" means having the attributes of an entity without possessing its physical form. For example, a virtual reference plan is an intangible or imaginary plane, rather than a physical one, with respect to which, e.g., location and/or orientation of other physical and/or intangible entities may be defined.

Referring generally to FIG. 1 and particularly to, e.g., FIGS. 8-13, apparatus 100 further comprises first fastener 119, extending fully through first arcuate through opening 111 of insert 137 and at least partially through third opening 115 of body 102. The preceding subject matter of this paragraph characterizes example 7 of the present disclosure, wherein example 7 also includes the subject matter according to example 6, above.

First fastener 119 enables the operator to adjust the rotational position of insert 137 with respect to body 102, and then fix the rotational position of insert 137 with respect to body 102.

Referring generally to FIG. 1 and particularly to, e.g., FIGS. 8-13, first fastener 119 is adjustable to be loosened or tightened relative to insert 137 and body 102. When first fastener 119 is loosened relative to insert 137 and body 102, insert 137 is rotatable relative to second surface 103 of body 102 about second symmetry axis 112 through an angle that is less than 360 degrees. When first fastener 119 is tightened relative to insert 137 and body 102, insert 137 is fixed relative to second surface 103 of body 102. The preceding subject matter of this paragraph characterizes example 8 of the present disclosure, wherein example 8 also includes the subject matter according to example 7, above.

Such an arrangement enables an operator to adjust the relationship between shaft 124 of latch 122 and housing 126 of latch 122 when clocking latch 122. In use, the operator may loosen first fastener 119 to adjust the rotational position of insert 137 with respect to body 102, and then tighten first fastener 119 to lock insert 137 in place.

Referring generally to FIG. 1 and particularly to, e.g., FIGS. 8-13, insert 137 further comprises second arcuate through opening 113, corresponding to a second portion of the virtual toroid. Body 102 further comprises fourth opening 117, formed through second surface 103 of body 102. Second arcuate through opening 113 of insert 137 is capable of being aligned with fourth opening 117 of body 102 when at least the portion of insert 137 is rotatably positioned within second opening 105 of body 102. The preceding subject matter of this paragraph characterizes example 9 of the present disclosure, wherein example 9 also includes the subject matter according to example 8, above.

Second arcuate through opening 113 may be positioned opposite to first arcuate through opening 111.

Referring generally to FIG. 1 and particularly to, e.g., FIGS. 8-13, apparatus 100 further comprises second fastener 121, extending fully through second arcuate through opening 113 of insert 137 and at least partially through fourth opening 117 of body 102. The preceding subject matter of this paragraph characterizes example 10 of the present disclosure, wherein example 10 also includes the subject matter according to example 9, above.

Second fastener 121 enables the operator to adjust the rotational position of insert 137 with respect to body 102, and then fix the rotational position of insert 137 with respect to body 102. Further, second fastener 121 may more securely fix the rotational position of insert 137 with respect to body 102 when first fastener 119 and second fastener 121 are tightened.

Referring generally to FIG. 1 and particularly to, e.g., FIGS. 8-13, second fastener 121 is adjustable to be loosened or tightened relative to insert 137 and body 102. When first fastener 119 and second fastener 121 are loosened relative to insert 137 and body 102, insert 137 is rotatable relative to second surface 103 of body 102 about second symmetry axis 112 through an angle that is less than 180 degrees. When first fastener 119 and second fastener 121 are tightened relative to insert 137 and body 102, insert 137 is fixed relative to second surface 103 of body 102. The preceding subject matter of this paragraph characterizes example 11 of the present disclosure, wherein example 11 also includes the subject matter according to example 10, above.

Such an arrangement enables an operator to adjust the relationship between shaft 124 of latch 122 and housing 126 of latch 122 when clocking latch 122. In use, the operator may loosen both first fastener 119 and second fastener 121 to adjust the rotational position of insert 137 with respect to body 102, and then tighten both first fastener 119 and second fastener 121 to lock insert 137 in place.

Referring generally to FIG. 1 and particularly to, e.g., FIG. 13, insert 137 comprises first alignment mark 101. The preceding subject matter of this paragraph characterizes example 12 of the present disclosure, wherein example 12 also includes the subject matter according to any one of examples 5 to 11, above.

First alignment mark 101 may represent a particular rotational position of insert 137 relative to surface 104 of body 102 about second symmetry axis 112. First alignment mark 101 may be a solid line, a dotted line, a dot, or any other marking on insert 137.

Referring generally to FIG. 1 and particularly to, e.g., FIG. 13, body 102 further comprises second alignment marks 101A on second surface 103. Each of second alignment marks 101A corresponds to a particular rotation of insert 137 relative to second surface 103 of body 102 about second symmetry axis 112. First alignment mark 101 on insert 137 is selectively alignable with any one of second alignment marks 101A. The preceding subject matter of this paragraph characterizes example 13 of the present disclosure, wherein example 13 also includes the subject matter according to example 12, above.

Second alignment marks 101A may help an operator properly rotate insert 137 to ensure proper clocking of latch 122. Aligning first alignment mark 101 with a particular second alignment mark 101A corresponds to a particular clocking of shaft 124 of latch 122 with respect to housing 126. For example, one of second alignment marks 101A may correspond to the desired clocking for a first type of latch 122, and another one of second alignment marks 101A may correspond to the desired clocking for a second type of latch 122.

Referring generally to FIG. 1 and particularly to, e.g., FIG. 13, each one of second alignment marks 101A is colored differently from any other one of second alignment marks 101A. The preceding subject matter of this paragraph characterizes example 14 of the present disclosure, wherein example 14 also includes the subject matter according to example 13, above.

Having different colors for each of second alignment marks 101A may enable an operator to more easily ensure that they are adjusting insert 137 such that alignment mark 101 is aligned with the proper second alignment mark 101A to thereby ensure proper clocking of latch 122.

Referring generally to FIG. 1 and particularly to, e.g., FIG. 13, each one of second alignment marks 101A is shaped differently from any other one of second alignment marks 101A. The preceding subject matter of this paragraph characterizes example 15 of the present disclosure, wherein example 15 also includes the subject matter according to any one of examples 13 to 14, above.

For example, one of second alignment marks 101A may be a dotted line, while another one of second alignment marks 101A may be a solid line. Having different shapes for each of second alignment marks 101A may enable an operator to more easily ensure that they are adjusting insert 137 such that alignment mark 101 is aligned with the proper second alignment mark 101A to thereby ensure proper clocking of latch 122.

Referring generally to FIG. 1 and particularly to, e.g., FIGS. 3-7, inlet 110 of first funnel 108 is recessed relative to second surface 103 of body 102 along a line parallel to second symmetry axis 112 of first funnel 108. The preceding subject matter of this paragraph characterizes example 16 of the present disclosure, wherein example 16 also includes the subject matter according to any one of examples 4 to 15, above.

Recessing inlet 110 of first funnel 108 may protect first funnel 108 from wear and tear during use.

Referring generally to FIG. 1 and particularly to, e.g., FIGS. 10-11, inlet 110 of first funnel 108 is flush with second surface 103 of body 102. The preceding subject matter of this paragraph characterizes example 17 of the present disclosure, wherein example 17 also includes the subject matter according to any one of examples 4 to 15, above.

Having inlet 110 of first funnel 108 flush with second surface 103 of body 102 may be easier to manufacture by eliminating an extra surface on apparatus 100.

Referring generally to FIG. 1 and particularly to, e.g., FIGS. 10-11, second surface 103 of body 102 is recessed relative to inlet 110 of first funnel 108 along a line parallel to second symmetry axis 112 of first funnel 108. The preceding subject matter of this paragraph characterizes example 18 of the present disclosure, wherein example 18 also includes the subject matter according to any one of examples 4 to 15, above.

Such an arrangement may be beneficial to enable an operator to more easily adjust the rotational position of first funnel 108 relative to second surface 103 of body 102.

Referring generally to FIG. 1 and particularly to, e.g., FIG. 6, first funnel 108 further comprises branches 123, extending laterally away from second symmetry axis 112 of first funnel 108. The preceding subject matter of this paragraph characterizes example 19 of the present disclosure, wherein example 19 also includes the subject matter according to any one of examples 1 to 18, above.

Branches 123 of first funnel 108 naturally rotates shaft 124 of latch 122 into the correct orientation as shaft 124 is placed in first funnel 108.

Referring generally to FIG. 1 and particularly to, e.g., FIG. 6, branches 123 of first funnel 108 are interconnected. The preceding subject matter of this paragraph characterizes example 20 of the present disclosure, wherein example 20 also includes the subject matter according to example 19, above.

Interconnecting branches 123 makes it easier for shaft 124 of latch 122 to find the correct position as shaft 124 is placed in first funnel 108.

Referring generally to FIG. 1 and particularly to, e.g., FIG. 6, branches 123 of first funnel 108 are at least three in number. The preceding subject matter of this paragraph characterizes example 21 of the present disclosure, wherein example 21 also includes the subject matter according to any one of examples 19 to 20, above.

Having at least three branches 123 ensures that shaft 124 of latch 122 is rotationally fixed once shaft 124 is placed in first funnel 108.

Referring generally to FIG. 1 and particularly to, e.g., FIG. 16, a cross-section of first funnel 108, taken in a plane perpendicular to second symmetry axis 112 of first funnel 108, comprises at least three inflection points 118. The preceding subject matter of this paragraph characterizes example 22 of the present disclosure, wherein example 22 also includes the subject matter according to any one of examples 19 to 21, above.

As used herein, an "inflection point" is a transition point between two interconnected portions of a line or segment, wherein the two interconnected portions are two straight non-collinear portions of the line or segment, a curved concave portion and a curved convex portion of the line or segment, a curved concave portion and a straight portion of the line or segment, or a curved convex portion and a straight portion of the line or segment, as viewed from one side of the line or segment.

Having at least three inflection points 118 ensures that shaft 124 of latch 122 is rotationally fixed once shaft 124 is placed in first funnel 108.

Referring generally to FIG. 1 and particularly to, e.g., FIG. 6, branches 123 are identical to each other. The preceding subject matter of this paragraph characterizes example 23 of the present disclosure, wherein example 23 also includes the subject matter according to any one of examples 19 to 22, above.

Having branches 123 identical to one another makes it easier for shaft 124 of latch 122 to find the correct position as shaft 124 is placed in first funnel 108.

Referring generally to FIG. 1 and particularly to, e.g., FIGS. 4-6, apparatus 100 further comprises curved convex surfaces 125, each located between two adjacent ones of branches 123. At least a portion of each one of branches 123 is recessed relative to curved convex surfaces 125 along second symmetry axis 112 of first funnel 108. The preceding subject matter of this paragraph characterizes example 24 of the present disclosure, wherein example 24 also includes the subject matter according to any one of examples 19 to 23, above.

Curved convex surfaces 125 have a slope such to ensure than shaft 124 of latch 122 either rotates clockwise or counterclockwise when shaft 124 is placed in first funnel 108. Curved convex surfaces 125 are designed to prevent shaft 124 from jamming when it is inserted in first funnel 108.

Referring generally to FIG. 1 and particularly to, e.g., FIG. 5, first funnel 108 further comprises ridges 127, each located on a corresponding one of the curved convex surfaces 125 and extending therefrom along a plane, parallel to second symmetry axis 112 of first funnel 108. The preceding subject matter of this paragraph characterizes example 25 of the present disclosure, wherein example 25 also includes the subject matter according to example 24, above.

Ridges 127 prevent shaft 124 from jamming when it is inserted in first funnel 108. Ridges 127 direct shaft 124 of latch 122 to either rotate clockwise or counterclockwise when shaft 124 is placed in first funnel 108.

Referring generally to FIG. 1 and particularly to, e.g., FIGS. 8, 10-11, and 15, apparatus 100 further comprises second openings 106A, formed in body 102 through surface 104 and clustered together with first opening 106. Each of second openings 106A is geometrically identical to first opening 106. The preceding subject matter of this paragraph characterizes example 26 of the present disclosure, wherein example 26 also includes the subject matter according to any one of examples 1 to 25, above.

Second openings 106A allow locating pin 130 to be placed in several different locations. This allows apparatus 100 to be adjusted to accept several different models of latches 122. Further, since each of second openings 106A provides a different angle of housing 126 of latch 122 relative to shaft 124 of latch 122, apparatus 100 may be used to clock each latch 122 differently.

As used herein, "clustered together" means that each of second openings 106A are positioned with a first distance between one another, wherein the first distance is less than a second distance that separates second openings from adjacent arrays of openings 139.

Referring generally to FIG. 1 and particularly to, e.g., FIG. 14, apparatus 100 further comprises plugs 129, which are one fewer in number than a combined quantity of second openings 106A and first opening 106. The preceding subject matter of this paragraph characterizes example 27 of the present disclosure, wherein example 27 also includes the subject matter according to example 26, above.

Plugs 129 may be used to prevent the wrong hole from being used for a given latch configuration.

Referring generally to FIG. 1 and particularly to, e.g., FIG. 14, each of plugs 129 is insertable into first opening 106 or one of second openings 106A. The preceding subject matter of this paragraph characterizes example 28 of the present disclosure, wherein example 28 also includes the subject matter according to example 27, above.

Plugs 129 may be inserted into the holes that are not being used during a given production run, thereby preventing an operator from using the wrong hole and thereby incorrectly clocking latch 122.

Referring generally to FIG. 1 and particularly to, e.g., FIGS. 3, 8-12, and 15, apparatus 100 further comprises third surface 131 of body 102, parallel to surface 104. Surface 104 is recessed relative to third surface 131. The preceding subject matter of this paragraph characterizes example 29 of the present disclosure, wherein example 29 also includes the subject matter according to any one of examples 26 to 28, above.

Surface 104 may be recessed relative to third surface 131 to allow plugs 129 from being accessible without providing an uneven surface for latch 122 to rest on.

Referring generally to FIG. 1 and particularly to, e.g., FIGS. 8, 10-12, and 15, apparatus 100 further comprises arrays of openings 139. Each opening of each of arrays of openings 139 is formed in body 102 through surface 104 and is geometrically identical to first opening 106. Apparatus 100 also comprises second surface 103, parallel to surface 104 of body 102 and recessed relative to surface 104 along a line parallel to second symmetry axis 112 of first funnel 108. Apparatus 100 additionally comprises second funnels 108A, formed in body 102 through second surface 103. Each one of second funnels 108A is geometrically identical to first funnel 108. The preceding subject matter of this paragraph characterizes example 30 of the present disclosure, wherein example 30 also includes the subject matter according to any one of examples 26 to 29, above.

The arrays of openings and the second funnels 108A may enable an operator to clock several latches in a short amount of time, while ensuring that each latch is clocked in a similar fashion.

Referring generally to FIG. 1 and particularly to, e.g., FIGS. 8, 10-12, and 15, arrays of openings 139 are arranged in a first linear configuration and second funnels 108A are arranged in a second linear configuration. The preceding subject matter of this paragraph characterizes example 31 of the present disclosure, wherein example 31 also includes the subject matter according to example 30, above.

Such a linear configuration may enable an operator to easily move down an assembly line to clock several latches in a short amount of time, while ensuring that each latch is clocked in a similar fashion.

Referring generally to FIG. 1 and particularly to, e.g., FIGS. 8, 10-12, and 15, arrays of openings 139 are arranged in a first circular configuration and second funnels 108A are arranged in a second circular configuration. The preceding subject matter of this paragraph characterizes example 32 of the present disclosure, wherein example 32 also includes the subject matter according to example 30, above.

The circular configuration may enable an operator to clock several latches in a short amount of time, while ensuring that each latch is clocked in a similar fashion.

Referring generally to FIG. 1 and particularly to, e.g., FIG. 3, apparatus 100 further comprises base 133. Body 102 is rotatably coupled to base 133. The preceding subject matter of this paragraph characterizes example 33 of the present disclosure, wherein example 33 also includes the subject matter according to any one of examples 1 to 32, above.

Having body 102 of apparatus 100 rotatably coupled base 133 enables an operator to stay in one place while rotating base 133 to clock several latches in a short amount of time, while ensuring that each latch is clocked in a similar fashion.

Referring generally to FIG. 1 and particularly to, e.g., FIGS. 3 and 15, body 102 further comprises cavity 135, recessed relative to surface 104 of body 102. The preceding subject matter of this paragraph characterizes example 34 of the present disclosure, wherein example 34 also includes the subject matter according to any one of examples 1 to 32, above.

Cavity 135 may be used to store locating pins 130 when they are not in use, so that an operator can simply grab locating pins 130 from cavity 135 as needed as the operator clocks latches 122.

Referring generally to, e.g., FIG. 1 and particularly to FIG. 18, method 200 of clocking shaft 124 of latch 122 relative to housing 126 of latch 122 is disclosed. Method 200 comprises (block 202) inserting one end of shaft 124 of latch 122 into first funnel 108, fixed relative to body 102 and having second rotational symmetry of at least a second order about second symmetry axis 112 of first funnel 108, to rotationally position shaft 124 relative to body 102. Method 200 also comprises (block 204) rotating housing 126 of latch 122 relative to shaft 124 of latch 122 to align through opening 128 in housing 126 of latch 122 with first opening 106, formed in body 102 through surface 104 of body 102. First opening 106 has first symmetry axis 107 and a first rotational symmetry of at least the second order about first symmetry axis 107. First symmetry axis 107 of first opening 106 is perpendicular to surface 104 of body 102. First symmetry axis 107 of first opening 106 is spaced fixed distance 114 away from second symmetry axis 112 of first funnel 108 along a line perpendicular to second symmetry axis 112 of first funnel 108. Fixed distance 114 is greater than zero. Method 200 additionally comprises (block 206) inserting a first portion of locating pin 130 into first opening 106 in body 102 so that at least a second portion of locating pin 130 is within through opening 128 in housing 126 of latch 122. Method 200 further comprises (block 208) securing shaft 124 of latch 122 relative to housing 126 of latch 122. The preceding subject matter of this paragraph characterizes example 35 of the present disclosure.

Method 200 is an improved method for clocking latches 122. In particular, shaft 124 of latch 122 is placed into first funnel 108. While shaft 124 is in first funnel 108, housing 126 is rotated until through opening 128 in housing 126 is aligned with first opening 106. Once through opening 128 is aligned with first opening 106, locating pin 130 is inserted to lock latch 122 in place. Using such a method, a number of latches may be identically clocked, thereby ensuring consistent engagement/disengagement of latches 122 in stowage bin 138 and eliminating the need for rework due to inconsistent clocking of latches 122.

Referring generally to, e.g., FIG. 1 and particularly to FIG. 18, according to method 200, securing shaft 124 of latch 122 relative to housing 126 of latch 122 comprises (block 210) tightening set screw 132, operable to rotationally fix shaft 124 of latch 122 relative to housing 126 of latch 122. The preceding subject matter of this paragraph characterizes example 36 of the present disclosure, wherein example 36 also includes the subject matter according to example 35, above.

Set screw 132 sets the angle of shaft 124 with respect to housing 126 of latch 122, such that each latch 122 is torqued to a consistent value.

Referring generally to, e.g., FIG. 1 and particularly to FIG. 18, according to method 200, first funnel 108 is formed in insert 137, a portion of insert 137 is positioned within second opening 105, formed in body 102 through second surface 103 that is fixed and recessed relative to surface 104. Insert 137 is rotatable relative to second surface 103 of body 102 about second symmetry axis 112 through an angle that is less than 360 degrees. Method 200 further comprises (block 212) rotating insert 137 relative to second surface 103 of body 102. Method 200 also comprises (block 214) securing insert 137 with respect to second surface 103 of body 102 such that insert 137 is no longer rotatable relative to surface 103. The preceding subject matter of this paragraph characterizes example 37 of the present disclosure, wherein example 37 also includes the subject matter according to any one of examples 35 to 36, above.

Such an arrangement enables an operator to adjust the relationship between shaft 124 of latch 122 and housing 126 of latch 122 when clocking latch 122. As discussed above, apparatus 100 may include first fastener 119 that enables the operator to adjust the rotational position of insert 137 with respect to body 102, and then fix the rotational position of insert 137 with respect to body 102. Further, apparatus 100 may include second fastener 121 that enables the operator to adjust the rotational position of insert 137 with respect to body 102, and then fix the rotational position of insert 137 with respect to body 102. In use, the operator may loosen first fastener 119 and/or second fastener 121 to adjust the rotational position of insert 137 with respect to body 102, and then tighten first fastener 119 and/or second fastener to lock insert 137 in place.

Referring generally to, e.g., FIG. 1 and particularly to FIG. 18, according to method 200, insert 137 comprises first alignment mark 101, and second surface 103 comprises second alignment marks 101A. Method 200 also comprises rotating insert 137 relative to surface 103 of body 102 (block 216) until first alignment mark 101 aligns with a selected one of second alignment marks 101A. Method 200 further comprises (block 218) securing insert 137 to second surface 103 of body 102 such that insert 137 is no longer rotatable relative to surface 103. The preceding subject matter of this paragraph characterizes example 38 of the present disclosure, wherein example 38 also includes the subject matter according to example 37, above.

First alignment mark 101 may represent a particular rotational position of insert 137 relative to surface 104 of body 102 about second symmetry axis 112. First alignment mark 101 may be a solid line, a dotted line, a dot, or any other marking on insert 137. Second alignment marks 101A may help an operator properly rotate insert 137 to ensure proper clocking of latch 122. Aligning first alignment mark 101 with a particular second alignment mark 101A corresponds to a particular clocking of shaft 124 of latch 122 with respect to housing 126. For example, one of second alignment marks 101A may correspond to the desired clocking for a first type of latch 122, and another one of second alignment marks 101A may correspond to the desired clocking for a second type of latch 122. In one example, each one of second alignment marks 101A is colored differently from any other one of second alignment marks 101A. Having different colors for each of second alignment marks 101A may enable an operator to more easily ensure that they are adjusting insert 137 such that alignment mark 101 is aligned with the proper second alignment mark 101A to thereby ensure proper clocking of latch 122. In another example, each one of second alignment marks 101A is shaped differently from any other one of second alignment marks 101A. For example, one of second alignment marks 101A may be a dotted line, while another one of second alignment marks 101A may be a solid line. Having different shapes for each of second alignment marks 101A may enable an operator to more easily ensure that they are adjusting the insert 137 such that alignment mark 101 is aligned with the proper second alignment mark 101A to thereby ensure proper clocking of latch 122.

Referring generally to, e.g., FIG. 1 and particularly to FIG. 18, according to method 200, the body 102 further comprises second openings 106A, formed in body 102 through surface 104 and positioned adjacent to first opening 106. Each of second openings 106A is geometrically identical to first opening 106. Method 200 further comprises (block 220) positioning plugs 129 in second openings 106A to prevent locating pin 130 from being inserted into second openings 106A. Plugs 129 are one fewer in number than a combined quantity of second openings 106A and first opening 106. The preceding subject matter of this paragraph characterizes example 39 of the present disclosure, wherein example 39 also includes the subject matter according to any one of examples 35 to 38, above.

Second openings 106A allow locating pin 130 to be placed in several different locations. This allows apparatus 100 to be adjusted to accept several different models of latches 122. Further, since each of second openings 106A provides a different angle of housing 126 of latch 122 relative to shaft 124 of latch 122, apparatus 100 may be used to clock each latch 122 differently. Plugs 129 may be inserted into the holes that are not being used during a given production run, thereby preventing an operator from using the wrong hole and thereby incorrectly clocking latch 122.

Referring generally to, e.g., FIG. 1 and particularly to FIG. 18, method 200 further comprises (block 222) mounting latch 122 to stowage bin 138. The preceding subject matter of this paragraph characterizes example 40 of the present disclosure, wherein example 40 also includes the subject matter according to any one of examples 35 to 39, above.

Mounting latch 122 to stowage bin 138 may include positioning shaft 124 of latch 122 through a through hole of stowage bin 138 and into square rod 142.

Referring generally to, e.g., FIG. 1 and particularly to FIG. 19, method 300 of clocking shaft 124 of latch 122 relative to housing 126 of latch 122 is disclosed. Method 300 comprises (block 302) inserting a first portion of locating pin 130 into first opening 106, passing through surface 104 of body 102 and having first symmetry axis 107 and a first rotational symmetry of at least a second order about first symmetry axis 107. Method 300 further comprises (block 204) aligning shaft 124 of latch 122 with inlet 110 of first funnel 108. First funnel 108 has a second rotational symmetry of at least the second order about second symmetry axis 112 of first funnel 108. First funnel 108 is fixed relative to body 102. First symmetry axis 107 of first opening 106 in body 102 is spaced fixed distance 114 away from second symmetry axis 112 of first funnel 108 along a line perpendicular to second symmetry axis 112 of first funnel 108. Fixed distance 114 is greater than zero. Method 300 also comprises (block 306) aligning through opening 128 in housing 126 of latch 122 with locating pin 130, the first portion of which is inserted into first opening 106 of body 102. Method 300 additionally comprises (block 308) inserting one end of shaft 124 of latch 122 into first funnel 108 to rotationally position shaft 124 relative to body 102 while simultaneously inserting a second portion of locating pin 130, the first portion of which is inserted into first opening 106 of body 102, into through opening 128 in housing 126 of latch 122. Method 300 further comprises (block 310) securing shaft 124 of latch 122 relative to housing 126 of latch 122. The preceding subject matter of this paragraph characterizes example 41 of the present disclosure.

Method 300 is an improved method for clocking latches 122. In particular, locating pin is positioned in first opening 106. Through opening 128 in housing 126 is then simultaneously lined up with locating pin 130 while shaft 124 of latch 122 is inserted into first funnel 108. Once latch 122 is in place, shaft 124 is secured relative to housing 126. Using such a method, subsequent latches may be identically clocked, thereby ensuring consistent engagement/disengagement of latches 122 in stowage bin 138 and eliminating the need for rework due to inconsistent clocking of latches 122.

Referring generally to, e.g., FIG. 1 and particularly to FIG. 19, according to method 300, securing shaft 124 of latch 122 relative to housing 126 of latch 122 comprises (block 312) tightening set screw 132, operable to rotationally fix shaft 124 of latch 122 relative to housing 126 of latch 122. The preceding subject matter of this paragraph characterizes example 42 of the present disclosure, wherein example 42 also includes the subject matter according to example 41, above.

Set screw 132 sets the angle of shaft 124 with respect to housing 126 of latch 122, such that each latch 122 is torqued to a consistent value.

Referring generally to, e.g., FIG. 1 and particularly to FIG. 19, according to method 300, first funnel 108 is formed in insert 137, a portion of insert 137 is positioned within second opening 105, formed in body 102 through second surface 103 that is fixed and recessed relative to surface 104, and insert 137 is rotatable relative to second surface 103 of body 102 about second symmetry axis 112 through an angle that is less than 360 degrees. Method 300 also comprises (block 314) rotating insert 137 relative to second surface 103 of body 102. Method 300 further comprises (block 316) securing insert 137 with respect to second surface 103 of body 102 such that insert 137 is no longer rotatable relative to surface 103. The preceding subject matter of this paragraph characterizes example 43 of the present disclosure, wherein example 43 also includes the subject matter according to any one of examples 41 to 42, above.

Such an arrangement enables an operator to adjust the relationship between shaft 124 of latch 122 and housing 126 of latch 122 when clocking latch 122. As discussed above, apparatus 100 may include first fastener 119 that enables the operator to adjust the rotational position of insert 137 with respect to body 102, and then fix the rotational position of insert 137 with respect to body 102. Further, apparatus 100 may include second fastener 121 that enables the operator to adjust the rotational position of insert 137 with respect to body 102, and then fix the rotational position of insert 137 with respect to body 102. In use, the operator may loosen first fastener 119 and/or second fastener 121 to adjust the rotational position of insert 137 with respect to body 102, and then tighten first fastener 119 and/or second fastener to lock insert 137 in place.

Referring generally to, e.g., FIG. 1 and particularly to FIG. 19, according to method 300, insert 137 comprises first alignment mark 101, and second surface 103 comprises second alignment marks 101A. Method 300 also comprises rotating insert 137 relative to surface 103 of body 102 (block 318) until first alignment mark 101 aligns with a selected one of second alignment marks 101A. Method 300 further comprises (block 320) securing insert 137 to second surface 103 of body 102 such that insert 137 is no longer rotatable relative to surface 103. The preceding subject matter of this paragraph characterizes example 44 of the present disclosure, wherein example 44 also includes the subject matter according to example 43, above.

First alignment mark 101 may represent a particular rotational position of insert 137 relative to surface 104 of body 102 about second symmetry axis 112. First alignment mark 101 may be a solid line, a dotted line, a dot, or any other marking on insert 137. Second alignment marks 101A may help an operator properly rotate insert 137 to ensure proper clocking of latch 122. Aligning first alignment mark 101 with a particular second alignment mark 101A corresponds to a particular clocking of shaft 124 of latch 122 with respect to housing 126. For example, one of second alignment marks 101A may correspond to the desired clocking for a first type of latch 122, and another one of second alignment marks 101A may correspond to the desired clocking for a second type of latch 122. In one example, each one of second alignment marks 101A is colored differently from any other one of second alignment marks 101A. Having different colors for each of second alignment marks 101A may enable an operator to more easily ensure that they are adjusting insert 137 such that alignment mark 101 is aligned with the proper second alignment mark 101A to thereby ensure proper clocking of latch 122. In another example, each one of second alignment marks 101A is shaped differently from any other one of second alignment marks 101A. For example, one of second alignment marks 101A may be a dotted line, while another one of second alignment marks 101A may be a solid line. Having different shapes for each of second alignment marks 101A may enable an operator to more easily ensure that they are adjusting insert 137 such that alignment mark 101 is aligned with the proper second alignment mark 101A to thereby ensure proper clocking of latch 122.

Referring generally to, e.g., FIG. 1 and particularly to FIG. 19, according to method 300, body 102 further comprises second openings 106A, formed in body 102 through surface 104 and positioned adjacent to first opening 106. Each of second openings 106A is geometrically identical to first opening 106. Method 300 further comprises (block 322) positioning plugs 129 in second openings 106A to prevent locating pin 130 from being inserted into second openings 106A. Plugs 129 are one fewer in number than a combined quantity of second openings 106A and first opening 106. The preceding subject matter of this paragraph characterizes example 45 of the present disclosure, wherein example 45 also includes the subject matter according to any one of examples 41 to 44, above.

Second openings 106A allow locating pin 130 to be placed in several different locations. This allows apparatus 100 to be adjusted to accept several different models of latches 122. Further, since each of second openings 106A provides a different angle of housing 126 of latch 122 relative to shaft 124 of latch 122, apparatus 100 may be used to clock each latch 122 differently. Plugs 129 may be inserted into the holes that are not being used during a given production run, thereby preventing an operator from using the wrong hole and thereby incorrectly clocking latch 122.

Referring generally to, e.g., FIG. 1 and particularly to FIG. 18, method 300 further comprises (block 324) mounting latch 122 to stowage bin 138. The preceding subject matter of this paragraph characterizes example 46 of the present disclosure, wherein example 46 also includes the subject matter according to any one of examples 41 to 45, above.

Mounting latch 122 to stowage bin 138 may include positioning shaft 124 of latch 122 through a through hole of stowage bin 138 and into square rod 142.

Examples of the present disclosure may be described in the context of aircraft manufacturing and service method 1100 as shown in FIG. 20 and aircraft 1102 as shown in FIG. 21. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for providing a specific angular relationship between a shaft of a latch and a housing of the latch during assembly of the latch, the apparatus comprising:
   a body, comprising a surface and a first opening, formed through the surface, wherein:
   the first opening has a first symmetry axis and a first rotational symmetry of at least a second order about the first symmetry axis, and the first symmetry axis is perpendicular to the surface of the body; and
   a first funnel, comprising an inlet and a second symmetry axis, wherein:
   the first funnel has a second rotational symmetry of at least the second order about the second symmetry axis;
   the second symmetry axis of the first funnel is parallel to the first symmetry axis of the first opening;
   the second symmetry axis of the first funnel is spaced a fixed distance away from the first symmetry axis of the first opening;
   the fixed distance is greater than zero; and
   the fixed distance is measured along a line perpendicular to the second symmetry axis of the first funnel.

2. The apparatus according to claim 1, wherein the first funnel is rotatable relative to the body about the second symmetry axis.

3. The apparatus according to claim 2, further comprising an insert, wherein:
   the body further comprises:
   a second surface, parallel to the surface of the body and recessed relative to the surface along a line parallel to the second symmetry axis of the first funnel; and
   a second opening, formed through the second surface of the body, wherein the second opening has a symmetry axis collinear with the second symmetry axis of the first funnel;
   the first funnel is formed in the insert; and
   at least a portion of the insert is positioned within the second opening of the body.

4. The apparatus according to claim 3, wherein at least the portion of the insert is rotatably positioned within the second opening of the body.

5. The apparatus according to claim 4, wherein:
   the insert comprises a first arcuate through opening, corresponding to a first portion of a virtual toroid; and
   the body further comprises a third opening, formed through the second surface of the body, wherein the first arcuate through opening of the insert is capable of being aligned with the third opening of the body when at least the portion of the insert is rotatably positioned within the second opening of the body.

6. The apparatus according to claim 5, further comprising:
   a first fastener, extending fully through the first arcuate through opening of the insert and at least partially through the third opening of the body.

7. The apparatus according to claim 4, wherein the insert comprises a first alignment mark.

8. The apparatus according to claim 7, wherein:
   the body further comprises second alignment marks on the second surface;
   each of the second alignment marks corresponds to a particular rotation of the insert relative to the second surface of the body about the second symmetry axis; and
   the first alignment mark on the insert is selectively alignable with any one of the second alignment marks.

9. The apparatus according to claim 8, wherein each one of the second alignment marks is colored differently from any other one of the second alignment marks.

10. The apparatus according to claim 8, wherein each one of the second alignment marks is shaped differently from any other one of the second alignment marks.

11. The apparatus (100) according to claim 3, wherein the inlet of the first funnel is recessed relative to the second surface of the body along a line parallel to the second symmetry axis of the first funnel.

12. The apparatus according to claim 3, wherein the inlet of the first funnel is flush with the second surface of the body.

13. The apparatus according to claim 3, wherein the second surface of the body is recessed relative to the inlet of the first funnel along a line parallel to the second symmetry axis of the first funnel.

14. The apparatus according to claim 1, wherein the first funnel further comprises branches, extending laterally away from the second symmetry axis of the first funnel.

15. The apparatus according to claim 14, wherein a cross-section of the first funnel, taken in a plane perpendicular to the second symmetry axis of the first funnel, comprises at least three inflection points.

16. The apparatus according to claim 14, further comprising curved convex surfaces, each located between two adjacent ones of the branches, wherein at least a portion of each one of the branches is recessed relative to the curved convex surfaces along the second symmetry axis of the first funnel.

17. The apparatus according to claim 16, wherein the first funnel further comprises ridges, each located on a corresponding one of the curved convex surfaces and extending therefrom along a plane, parallel to the second symmetry axis of the first funnel.

18. The apparatus according to claim 14, wherein the branches of the first funnel are interconnected.

19. The apparatus according to claim 14, wherein the branches of the first funnel are at least three in number.

20. The apparatus according to claim 14, wherein the branches are identical to each other.

21. The apparatus according claim 1, further comprising second openings, formed in the body through the surface and clustered together with the first opening, wherein each of the second openings is geometrically identical to the first opening.

22. The apparatus according to claim 21, further comprising plugs, wherein the plugs are one fewer in number than a combined quantity of the second openings and the first opening.

23. The apparatus according to claim 22, wherein each of the plugs is insertable into the first opening or one of the second openings.

24. The apparatus according to claim 21, further comprising:
arrays of openings, wherein each opening of each of the arrays of openings is formed in the body through the surface and is geometrically identical to the first opening;
a second surface, parallel to the surface of the body and recessed relative to the surface along a line parallel to the second symmetry axis of the first funnel; and
second funnels, formed in the body through the second surface, wherein each one of the second funnels is geometrically identical to the first funnel.

25. The apparatus according to claim 24, wherein the arrays of openings are arranged in a first linear configuration and the second funnels are arranged in a second linear configuration.

26. The apparatus according to claim 24, wherein the arrays of openings are arranged in a first circular configuration and the second funnels are arranged in a second circular configuration.

27. The apparatus according to claim 21, further comprising:
a third surface of the body, parallel to the surface, wherein the surface is recessed relative to the third surface.

28. The apparatus according to claim 1, wherein the first funnel is fixed relative to the body.

29. The apparatus according to claim 6, wherein:
the first fastener is adjustable to be loosened or tightened relative to the insert and the body;
when the first fastener is loosened relative to the insert and the body, the insert is rotatable relative to the second surface of the body about the second symmetry axis through an angle that is less than 360 degrees; and
when the first fastener is tightened relative to the insert and the body, the insert is fixed relative to the second surface of the body.

30. The apparatus according to claim 29, wherein:
the insert further comprises a second arcuate through opening, corresponding to a second portion of the virtual toroid; and
the body further comprises a fourth opening, formed through the second surface of the body, wherein the second arcuate through opening of the insert is capable of being aligned with the fourth opening of the body when at least the portion of the insert is rotatably positioned within the second opening of the body.

31. The apparatus according to claim 30, further comprising a second fastener, extending fully through the second arcuate through opening of the insert and at least partially through the fourth opening of the body.

32. The apparatus according to claim 31, wherein:
the second fastener is adjustable to be loosened or tightened relative to the insert and the body;
when the first fastener and the second fastener are loosened relative to the insert and the body, the insert is rotatable relative to the second surface of the body about the second symmetry axis through an angle that is less than 180 degrees; and
when the first fastener and the second fastener are tightened relative to the insert and the body, the insert is fixed relative to the second surface of the body.

33. The apparatus (100) according to claim 1, further comprising a base, wherein the body is rotatably coupled to the base.

34. The apparatus according to claim 1, wherein the body further comprises a cavity, recessed relative to the surface of the body.

35. A method of providing a specific angular relationship between a shaft of a latch and a housing of the latch during assembly of the latch, the method comprising:
inserting one end of the shaft of the latch into a first funnel, fixed relative to a body and having a second rotational symmetry of at least a second order about a second symmetry axis of the first funnel, to rotationally position the shaft relative to the body;
rotating the housing of the latch relative to the shaft of the latch to align a through opening in the housing of the latch with a first opening, formed in the body through a surface of the body, wherein:
the first opening has a first symmetry axis and a first rotational symmetry of at least the second order about the first symmetry axis;
the first symmetry axis of the first opening is perpendicular to the surface of the body; and
the first symmetry axis of the first opening is spaced a fixed distance away from the second symmetry axis of the first funnel along a line perpendicular to the second symmetry axis of the first funnel, wherein the fixed distance is greater than zero;
inserting a first portion of a locating pin into the first opening in the body so that at least a second portion of the locating pin is within the through opening in the housing of the latch; and
securing the shaft of the latch relative to the housing of the latch.

36. The method according to claim 35, wherein securing the shaft of the latch relative to the housing of the latch comprises tightening a set screw, operable to rotationally fix the shaft of the latch relative to the housing of the latch.

37. The method according to claim 35, wherein the first funnel is formed in an insert, a portion of the insert is positioned within a second opening, formed in the body through a second surface that is fixed and recessed relative to the surface, and the insert is rotatable relative to the second surface of the body about the second symmetry axis through an angle that is less than 360 degrees, the method further comprising:

rotating the insert relative to the second surface of the body; and securing the insert with respect to the second surface of the body such that the insert is no longer rotatable relative to the surface.

38. The method according to claim 37, wherein the insert comprises a first alignment mark, and the second surface comprises second alignment marks, the method further comprising:

rotating the insert relative to the surface of the body until the first alignment mark aligns with a selected one of the second alignment marks ; and securing the insert to the second surface of the body such that the insert is no longer rotatable relative to the surface.

39. The method according to claim 35, wherein the body further comprises second openings, formed in the body through the surface and positioned adjacent to the first opening, and each of the second openings is geometrically identical to the first opening, the method further comprising:

positioning plugs in the second openings to prevent the locating pin from being inserted into the second openings, wherein the plugs are one fewer in number than a combined quantity of the second openings and the first opening.

40. The method according to claim 35, further comprising mounting the latch to a stowage bin.

41. A method of providing a specific angular relationship between a shaft of a latch and a housing of the latch during assembly of the latch, the method comprising:

inserting a first portion of a locating pin into a first opening, passing through a surface of a body and having a first symmetry axis and a first rotational symmetry of at least a second order about the first symmetry axis;

aligning the shaft of the latch with an inlet of a first funnel, wherein:

the first funnel has a second rotational symmetry of at least the second order about a second symmetry axis of the first funnel;

the first funnel is fixed relative to the body, and the first symmetry axis of the first opening in the body is spaced a fixed distance away from the second symmetry axis of the first funnel along a line perpendicular to the second symmetry axis of the first funnel, wherein the fixed distance is greater than zero;

aligning a through opening in the housing of the latch with the locating pin, the first portion of which is inserted into the first opening of the body;

inserting one end of the shaft of the latch into the first funnel to rotationally position the shaft relative to the body while simultaneously inserting a second portion of the locating pin, the first portion of which is inserted into the first opening of the body, into the through opening in the housing of the latch; and securing the shaft of the latch relative to the housing of the latch.

42. The method according to claim 41, wherein securing the shaft of the latch relative to the housing of the latch comprises tightening a set screw, operable to rotationally fix the shaft of the latch) relative to the housing of the latch.

43. The method according to claim 41, wherein the first funnel is formed in an insert, a portion of the insert is positioned within a second opening, formed in the body through a second surface that is fixed and recessed relative to the surface, and the insert is rotatable relative to the second surface of the body about the second symmetry axis through an angle that is less than 360 degrees, the method further comprising:

rotating the insert relative to the second surface of the body; and securing the insert with respect to the second surface of the body such that the insert is no longer rotatable relative to the surface.

44. The method according to claim 43, wherein the insert comprises a first alignment mark, and the second surface comprises second alignment marks, the method further comprising:

rotating the insert relative to the surface of the body until the first alignment mark aligns with a selected one of the second alignment marks; and securing the insert to the second surface of the body such that the insert is no longer rotatable relative to the surface.

45. The method according to claim 41, wherein the body further comprises second openings, formed in the body through the surface and positioned adjacent to the first opening, and each of the second openings is geometrically identical to the first opening, the method further comprising:

positioning plugs in the second openings to prevent the locating pin from being inserted into the second openings, wherein the plugs are one fewer in number than a combined quantity of the second openings and the first opening.

46. The method according to claim 41, further comprising mounting the latch to a stowage bin.

* * * * *